United States Patent
Florek

(10) Patent No.: US 9,742,468 B2
(45) Date of Patent: Aug. 22, 2017

(54) METHOD AND SOLUTION OF DATA TRANSMISSION FROM THE TRANSPONDER TO THE READER, ESPECIALLY IN PAYMENT SOLUTIONS WITH A MOBILE COMMUNICATION DEVICE

(75) Inventor: Miroslav Florek, Bratislava (SK)

(73) Assignee: SMK Corporation (JP)

( * ) Notice: Subject to any disclaimer, the term of this patent is extended or adjusted under 35 U.S.C. 154(b) by 750 days.

(21) Appl. No.: 12/992,243

(22) PCT Filed: Sep. 30, 2010

(86) PCT No.: PCT/IB2010/054412
§ 371 (c)(1),
(2), (4) Date: Nov. 11, 2010

(87) PCT Pub. No.: WO2011/058455
PCT Pub. Date: May 19, 2011

(65) Prior Publication Data
US 2011/0238518 A1    Sep. 29, 2011

(30) Foreign Application Priority Data

Nov. 14, 2009 (SK) .................................. 50051-2009

(51) Int. Cl.
*H04B 5/00* (2006.01)
*G06K 19/077* (2006.01)
*G06Q 30/06* (2012.01)

(52) U.S. Cl.
CPC ..... *H04B 5/0031* (2013.01); *G06K 19/07732* (2013.01); *G06K 19/07749* (2013.01); *G06Q 30/0601* (2013.01); *H04B 5/0093* (2013.01)

(58) Field of Classification Search
None
See application file for complete search history.

(56) References Cited

U.S. PATENT DOCUMENTS 5,995,950 A    11/1999    Barns-Slavin et al.
6,028,503 A *   2/2000    Preishuberpflugl .. G06K 7/0008
                                           340/10.4

(Continued)

FOREIGN PATENT DOCUMENTS

| CN | 201075228 | 6/2008 |
|---|---|---|
| EP | 1403963 | 3/2004 |

(Continued)

*Primary Examiner* — Zhiyu Lu
(74) *Attorney, Agent, or Firm* — Baker & Hostetler LLP

(57) ABSTRACT

The method and solution can be mainly used for data transmission in cashless payment applications, especially those realized from the mobile phone while using RFID and/or NFC platform. The signals with different frequency are combined in antenna system (M) of the receiver (1) and transmitter (2) and then the carrier signal is separated from the result of the combined signals and the transmitted data are demodulated. The difference between the frequencies has a value, that corresponds to the size of the subcarrier frequency to which the receiver (1) is preset.
During transmission the transformer connection coefficient can have the value k=0.2-0.001, while the antenna (3) of the receiver (2) is tuned narrowly to the transmitter's (2) frequency without considering the subcarrier frequency. The transmitter is preferably located on a memory card or on a card with a format and interface of a memory card, e.g. micro SD.

20 Claims, 4 Drawing Sheets

(56) References Cited

U.S. PATENT DOCUMENTS

| | | | |
|---|---|---|---|
| 2002/0153997 A1* | 10/2002 | Nakane et al. ............ 340/10.34 |
| 2007/0026893 A1* | 2/2007 | Sakamoto et al. ............ 455/558 |
| 2007/0045418 A1* | 3/2007 | Charrat ................ G06K 7/0008 235/451 |
| 2008/0191031 A1* | 8/2008 | Smets et al. .................. 235/492 |
| 2009/0040022 A1* | 2/2009 | Finkenzeller ........ G06K 7/0008 340/10.1 |
| 2009/0174556 A1* | 7/2009 | Horne .............. G06K 19/07336 340/572.3 |
| 2009/0227213 A1 | 9/2009 | Sadeghfam et al. |
| 2009/0291635 A1* | 11/2009 | Savry ........................... 455/41.1 |
| 2010/0009627 A1* | 1/2010 | Huomo ................ H04B 5/0031 455/41.1 |
| 2011/0042465 A1* | 2/2011 | Smets ................. G06K 7/0008 235/492 |

FOREIGN PATENT DOCUMENTS

| | | |
|---|---|---|
| EP | 2101278 | 9/2009 |
| WO | WO 2004/107595 | 12/2004 |
| WO | WO 2005/104022 | 11/2005 |

\* cited by examiner

METHOD AND SOLUTION OF DATA TRANSMISSION FROM THE TRANSPONDER TO THE READER, ESPECIALLY IN PAYMENT SOLUTIONS WITH A MOBILE COMMUNICATION DEVICE

CROSS-REFERENCE TO RELATED APPLICATIONS

This application is the National Stage of PCT Application No. PCT/IB2010/054412, filed Sep. 30, 2010, which claims the benefit of Slovak Patent Application No. PP50051-2009, filed Nov. 14, 2009, the disclosures of which are incorporated herein by reference in their entirety.

FIELD OF THE INVENTION

The invention refers to the contactless radio-frequency data transmission between a transmitter and a receiver when there is a weak transformer connection in operational volume. In cashless payment solutions, the transmitter and the receiver are, above all, in the form of a transponder and reader. The invention also describes the integration for the realization of data transmission with lowered level of noise, which especially concerns the readers with RFID and/or NFC platform.

BACKGROUND OF THE INVENTION

It is common that during data transmission amplitude or phase modulation of the transmitted information is used by using a carrier and a subcarrier signal. The standard for contactless communication ISO 14443 characterizes the conditions of the A or B modulation with carrier signal having the 13.56 MHz frequency. The data transmitted are modulated into the subcarrier frequency in the transmitter and the subcarrier frequency is combined with the basic, carrier signal. The result will be a frequency superposition with transmitted data, that are detected in the receiver by separation of the carrier signal from the received spectrum. For short-distance data transmission, a transformer connection between the antenna systems of the receiver and the transmitter is used. When using a transformer connection, the frequency signal does not have to be actively transmitted; it is sufficient if the induction circuit of the transponder antenna is short-circuited on a needed frequency. These changes on the transponder's side can be measured on the receiver's antenna output. This configuration is common in contactless communication between cards and the readers of the cards.

During transmission from the shielded or more remote transponder, the transformer connection is weak, with the coefficient being k=0.2-0.001, which considerably deteriorates the transmission characteristics of the communication channel. Nevertheless, the transponder's antenna system must be capable of transmitting the frequency spectrum which includes the carrier and subcarrier frequency. This situation is shown on the FIG. 1. In specific conditions, e.g. in case the transponder is shielded or interfered with, it is necessary to improve the transmission characteristics of the system, to lower noise and to improve the reception of the signal being received, all without requiring increase in the radiated power.

The existing technical solution enables a reliable data transmission from the contactless cards, e.g. from the payment cards in case the card is within the operating volume of the reader and in case the card is not shielded or interfered with. Along with the development of new functions of the mobile communication devices, there is a tendency to place the payment card into the mobile communication device, which deteriorates the transmission characteristics of the pair transponder-reader; the deterioration is up to the point when transmission failure takes place in common non-laboratory conditions. Also, in case of other transmission systems, it is required to reduce noise and improve the possibilities of antenna system's tuning.

The technical solutions as in patent files WO 2004/107595A1, EP 2101278A2, U.S. Pat. No. 5,955,950, WO 2005/104022A1, EP 1403963 B1, CN 201075228 describe connections enabling better detection of a received signal or possibilities of antenna tuning; however these always require changes on the side of the receiver and it is not possible to expect dramatic improvement of the transmission in weak transformer connections. Such a technical solution that will improve transmission characteristics of the system and that would not require any changes in the hardware and software of already used readers is required.

The technical problem can be in general solved even by a new, purpose-designed dimensation of the transmitter-receiver pair. However, in case when in business practice there are receivers e.g. in the form of the POS terminal readers that are massively used, it is practically impossible to put new readers through widely and quickly. Above all, this problem arises during introduction of new transmission channels based on contactless communication elements located on the removable memory card in the mobile phone according to Logomotion's other solutions. The common solution that is on hand to a average technician is not usable for this reason.

SUMMARY OF THE INVENTION

The deficiencies mentioned are to a large extent eliminated by the method in which the data are transmitted from the transmitter into the receiver while using transformer connection of the transmitter's and receiver's antenna inductions. In this situation the receiver transmits a carrier signal, while the receiver analyzes the signal it received from the output of its antenna as a combination of the carrier frequency and the modulated subcarrier frequency containing data as is described by this invention. The subject matter of this invention is in the fact that the transmitter transmits a signal with a frequency that is different from the carrier frequency that is transmitted by the receiver. This difference in frequency is not caused by an inaccuracy, but is intentional and significant. The difference in frequency is in the extent of the subcarrier frequency, to the usage of which the receiver is preset. The transmittance of the carrier signal from the receiver can also have as its task to supply the receiver with energy. In common solutions, the reception of the carrier signal in the transmitter starts the run of the applications in the transmitter. In this sense it is necessary to understand the way the elements are named—the transmitter is an element from which data are sent in a monitored phase as described by this invention, though from physical point of view the transmitter can also be a receiver of the power supply signal. The subject matter of protection of this invention is generally one data flow course and for this reason it is possible to name the elements—the transmitter and the receiver—even though these functions can interchange in case of both way transmission.

The fact that the receiver analyzes the signal received on the output of its antenna as a signal in the form of a connection of a carrier frequency and a modulated subcarrier frequency determines that the method described here concerns situations, in which the receiver processes the modulated signal in the way used until now. However in reality while doing it the transmitter does not transmit the subcarrier frequency.

The change in the transmitter's transmitting frequency, as opposed to the receiver's carrier frequency, is chosen in such a way, so there would not even be necessary to change the evaluation method of the received signal on the side of the receiver nor it would be necessary to change the connection of the receiver. The change in the transmitting frequency can be preset to both sides of the carrier frequency value, which means that the transmitting frequency can be lower or higher than the value of the receiver's carrier frequency.

Due to the small mutual distance, a transformer connection is created in the antenna system that is formed by the receiver's antenna and the transmitter's antenna. During data transmission, the receiver sends its carrier frequency to the antenna, the transmitter sends a modulated signal with a different frequency to its antenna and then the signals of different frequencies are combined in the mutual antenna system.

If the frequency carrier signal $f_r$ ($\omega_r$ in frequency domain) has an amplitude R and the second frequency $f_t$ ($\omega_t$) has the amplitude T and phase $\phi$ while $f_r \neq f_t$ and $\omega r = \omega t + \Delta \omega$, than the basic equation $v(t) = R \cdot e^{j\omega r \cdot t} + T \cdot e^{j\omega r \cdot t + \phi}$ can be modified to (1)

$$v(t) = \underbrace{R \cdot e^{j\omega r \cdot t}}_{original} \cdot \left[1 + \underbrace{\frac{T}{R} \cdot e^{j\Delta\omega \cdot t + \varphi}}_{subcarrier}\right]$$

The output from the receiver's antenna is analyzed in the receiver. This output on the receiver's antenna has the same character as if the transponder transmitted on the carrier frequency with a modulation of subcarrier signal while using load modulation. Then, from the result of the frequency combining, the signal carrier is transponded in the receiver and the result obtained corresponds to the modulated subcarrier signal, even though the transmitter does not physically use the subcarrier signal. The data transmitted can be received from this signal through modulation, even when in reality they were modulated directly into the transmission frequency. The data procession method is not changed by this kind of configuration for the receiver, which is an important factor, since it enables using existing receivers with new transmitters. The reverse data flow direction can be the same as it was until now.

In case the receiver, as described by this invention, transmits its signal outside the mutual induction it has with the receiver's antenna, the transmitted signal will not correspond to the usage of subcarrier frequency, since the transmitter does not transmit it and the receiver that would expect a standard signal structure would not be able to evaluate this kind of signal. Only when mutual induction is created, the physical effect of merging different frequencies occurs. The difference between these frequencies is deliberately set to the extent of expected subcarrier frequency. The signal received in such a way is processed by the receiver in the same way as it is done in up until now existing solutions. The significant contribution of this invention is, that it does not require changes on the side of the existing receiver. The receiver will be located e.g. in the mobile phone, specifically on the card of some of SD card's format. During realization of cashless payment, the mobile phone with the transmitter on the memory card is approached to the receiver, which is within the POS terminal's reader. The signal is generated in the card and is modulated with the frequency that is different from the frequency generated by the receiver as a carrier frequency. The signal from the receiver is combined with the signal from the transmitter and forms a signal in the form of combined signal, which appears in the receiver to be a signal that is in accordance with existing structure. The receiver, reader then processes a merged, combined signal as is common in existing processes.

It is suitable if the transmitted data are modulated directly by a change in phase of the transponder's frequency $\phi=0°$, not $\phi=180°$. It is sufficient if the phase of the frequency transmitted is changed during modulation once per basic time unit—etu. In this way a smaller number of phase changes is sufficient, a situation which lowers the requirements on the modulation management on the transponder side and which also lowers noise.

The method described is capable of operation in transformer connection between the transmitter and the receiver, the advantages of this method primarily appear in weak transformer connection with the transformer connection coefficient k=0.2–0.001.

From the point of view of using existing receivers, it is suitable if the carrier signal $f_r$ has the 13.56 MHz±7 kHz frequency. The difference between the signal carrier frequency and the transmitter's frequency is formed entirely by the carrier frequency, preferably by 1/16 of the carrier frequency, which corresponds to the 847 kHz. This relationship between the frequencies is advantageous from the hardware point of view, where it is possible to use existing electronic elements for division of frequencies and is also advantageous from the point of view of conformity with existing standards. The frequency generated by the transmitter $f_t$ will be of the 13.56 MHz+847 kHz=14.4075 MHz value, with the same tolerance of ±7 kHz as well.

The signal detected on the receiver's side corresponds to the situation during common load modulation of the carrier frequency. However, in present solutions and methods, the antenna's load would have to be changed every half-wave of the subcarrier signal—which in case of carrier frequency being 13.56 MHz, would be approximately every 0.6 μs. In the solution and method according to this invention it is sufficient if the change is done only once per 1 etu, so approximately it would be every 9.3 μs. Smaller bandwidth of changes generates less noise with the value NoisePower=10·log(16)=12 dB.

The data transmission method according to this invention enables to tune the transmitter's antenna to a narrow transmission frequency, whereas it is not necessary to consider the antenna's transmission characteristics for subcarrier frequency. In reality the transmitter does not use subcarrier frequency; the subcarrier frequency is present only during the frequency interference. The receiver expects reception of the subcarrier frequency; in configurations according to ISO 14443, the absence of the subcarrier signal on the receiver's antenna output would prevent any kind of communication from taking place.

In preferable solution, the transmitter will be a transponder and the receiver will be a reader e.g. on the RFID and/or NFC platform. The method described will find wide application during transmissions in which the transmitter is located on or in the mobile communication device, preferably on the card, which is (in a removable manner) placed into the mobile communication device's slot. In that being the case it is not practically possible to increase the transformer connection coefficient and the improvement of transmission characteristics is the main advantage of the method described in this invention. The transmitter antenna is tuned to a narrow frequency characteristic, which corresponds to the transmitting frequency. In case of reverse data course a different frequency is used, which does not create any transmission difficulties on the transmitter's/transponder's side, since the reader transmit with a considerably higher energy and even with a higher frequency spectrum.

It is suitable to use the described method of data transmission in cashless payment solutions, especially those over the mobile communication device. The essential advantage is the fact that the method described does not require any changes in the processes or hardware on the receiver's side i.e. the reader side. The reader can be for example a communication element of the POS terminal. During reverse data flow from the receiver to the transmitter, the transmission process is the same as in existing and commonly used methods. However, in case of this kind of data flow, there is no problem with transmission characteristics of the system, since the reader can transmit with a considerably higher energy.

In order to implement the method according to this invention, the solution in the transponder for data transmission (while using the transformer connection of the receiver's and transmitter's antenna inductions) is also subject to required protection. This solution contains antenna, modulation and demodulation element and its subject matter lays in the fact that it also includes an electromagnetic wave generator with a frequency that is different from the receiver's frequency. The usage of the electromagnetic wave generator in the solution is not common in a transformer connection of the receiver's and transmitter's antenna inductions, since up till now a load modulation on the side of the transmitter was used. In our solution the generator will be the oscillator of electromagnetic waves and the transmission data are connected to the oscillator's input.

Since the transmitter in the form of a transponder should be able to operate even during the reverse data flow, the transmitter's demodulation element will be connected to the turning of the induction heading towards sensor resistor. To eliminate voltage peaks at the entrance into the demodulation element, the demodulation element will be connected via inductor. The turning from the scanned induction is set to the level of the receiver's frequency signal carrier. The power supply of the transmitter's circuit can be ensured from the received electromagnetic field, in which case the transmitter can be considered to be a passive element; however the power supply can be secured also by its own power source. In case of implementation of the transmitter into the memory card in the mobile phone according to this solution, the transmitter can be supplied with energy over the card's interface.

The solution and method as described in this invention facilitates the signal modulation on the side of the transponder, lowers the noise and enables to tune the transponder's antenna narrowly and effectively. These effects improve transmission characteristics even when the transformer connection is weak, which creates the prerequisite for quality data transmission from the card that is located in the mobile phone slot. The solution and method described can be used even in other transmission solutions, e.g. in galvanic separated data transmission from the sensors, during data transmission from moving, oscillating elements and similar. The solution and method according to this invention enables to optimize transmission systems in data transmission from the sensors used in medicine, car technique and similar. The frequency values mentioned here are suitable settings and corresponding to existing norms and standards, but it is possible to apply the described way of frequency combination even on completely different frequency values, since the creation of the subcarrier signal in frequency combiner is based on generally valid manifestations of wave.

DETAILED DESCRIPTION OF THE INVENTION

Figure 1:
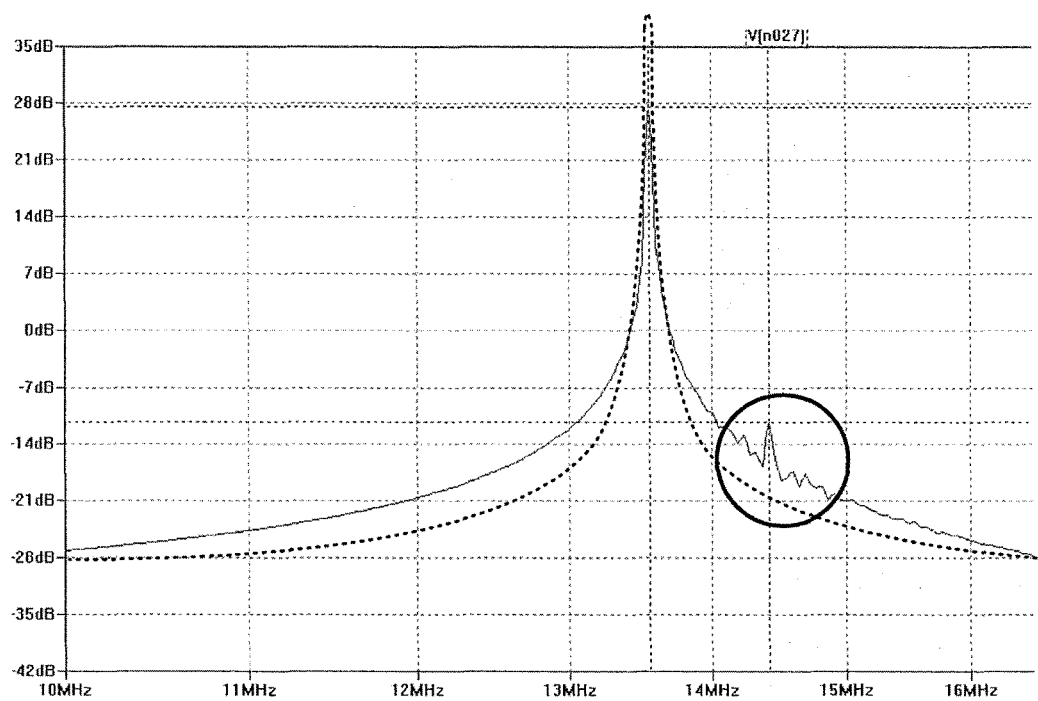
FIG. 1 illustrates the FTT spectrum during transmission of carrier and subcarrier frequency in an exemplary embodiment where the value of the carrier frequency is 13.56 MHZ and the subcarrier frequency is +847 kHz.

The invention is described in more detail in the FIGS. 1 to 6, where in the FIG. 1, there is the FFT spectrum during transmission of carrier and subcarrier frequency as in today's existing description. The value of carrier frequency is 13.56 MHZ and the subcarrier is +847 kHz. The frequency spectrum curve that is marked in full line corresponds to the today's existing transmission system that is transmitting subcarrier frequency. The dotted line presents the course in case the antenna is tuned to a narrowed frequency as in current solutions, which tune the antenna to a narrow peak. The level of the carrier frequency signal is increased, but the subcarrier signal in the circle is "cut down".

Figure 2:
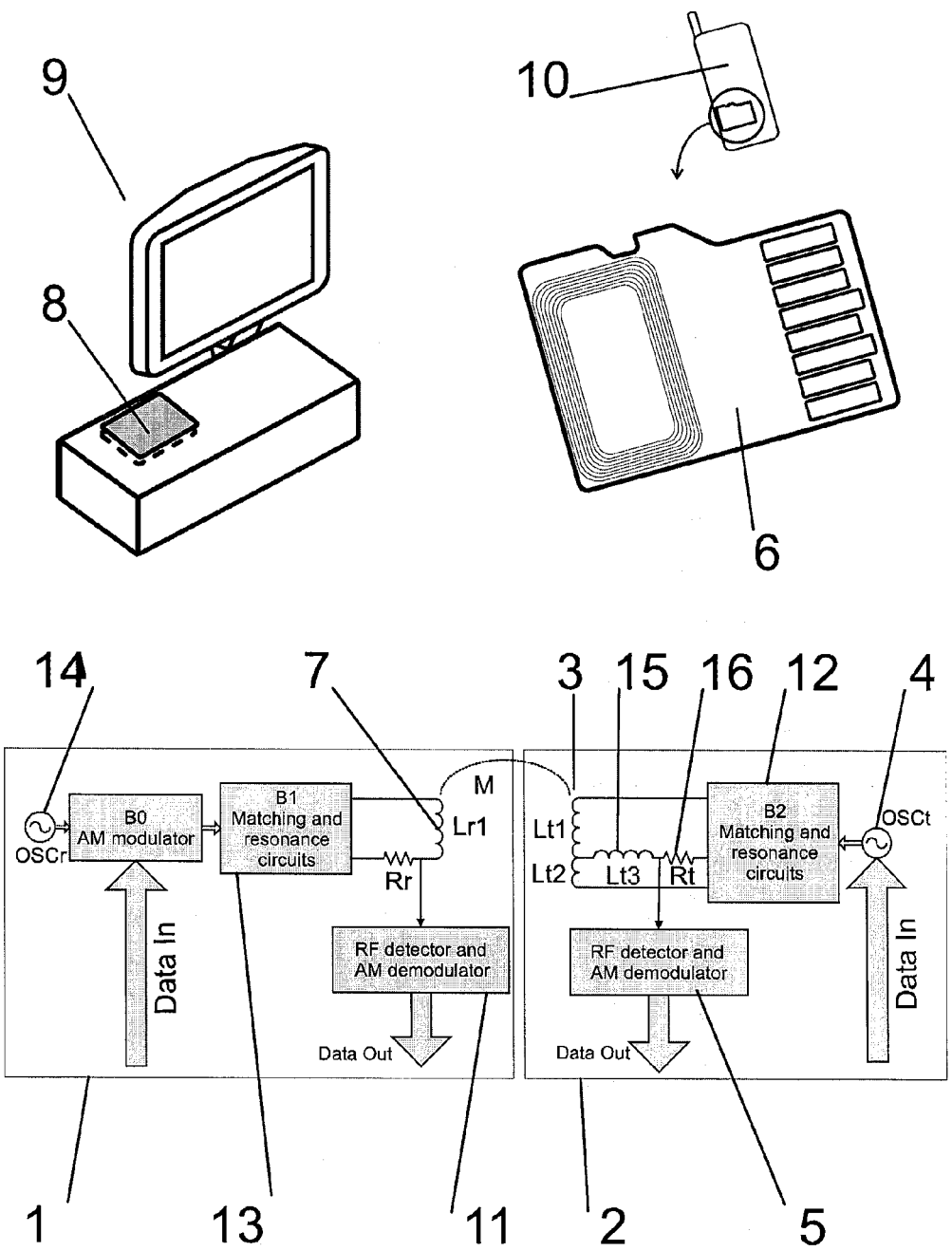
FIG. 2 illustrates a block scheme showing the connection between the reader and the transponder, in which the receiver is the POS terminal reader and the transmitter, in the form of a NFC transponder that is implemented in the mobile phone's memory card.

On the FIG. 2, there is a block scheme showing the connection between the reader and the transponder, in which the receiver is the POS terminal reader and the transmitter, in the form of a NFC transponder, is implemented in the mobile phone's memory card. The location of the receiver's scheme on the left side and the transmitter's scheme on the right side in the lower part of the figure corresponds to the left and right location of the POS terminal and the mobile phone. The placement of the receiver's scheme on the left side and the transmitter's scheme on the right side in the lower part of the figure corresponds to the left and right location of the POS terminal and the mobile phone. The intentional difference in frequencies of the transmitter and the receiver is emphasized by a different index next to the oscillator's mark. In the transmitter's connection there is depicted even the preferable usage of the inductor and scanner resistance.

Figure 3:
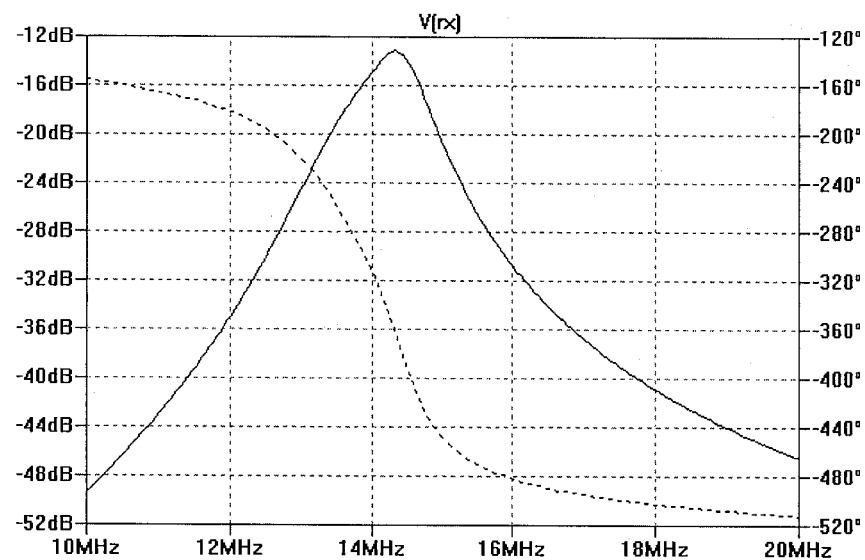
FIG. 3 illustrates the system transmission in the data follow direction from the POS terminal's reader towards the transponder.

On the FIG. 3 there is the system transmission in the data follow direction from the POS terminal's reader towards the transponder. The full line present the level of the signal depending on the frequency. The dotted line is a phase course.

Figure 4:
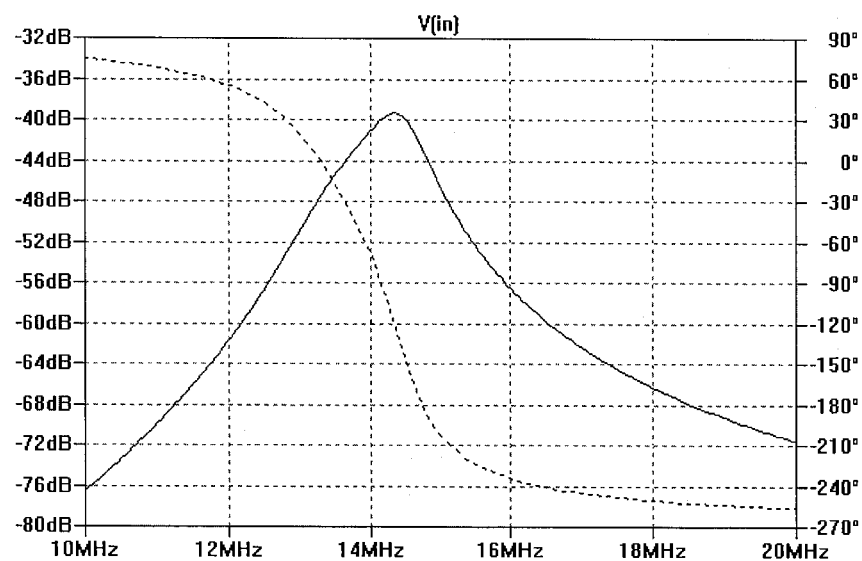
FIG. 4 illustrates the system transmission in the data flow direction from the transponder towards the POS terminal reader, in which the data transmission is approximately 30 dB weaker in comparison to the reverse flow direction.

On the FIG. 4 there is the system transmission in the data flow direction from the transponder towards the POS terminal reader, in which we can see that the data transmission is approximately 30 dB weaker in comparison to the reverse flow direction. The interrupted line is the course of the phase.

Figure 5:
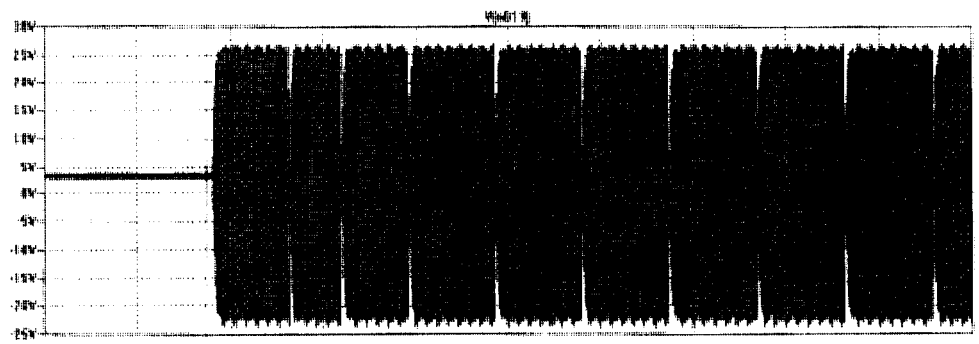
FIG. 5 illustrates an analogue signal course on the receiver's antenna, which was created by frequency combination with the modulated signal.

On the FIG. 5 there is analogue signal course on the receiver's antenna, which was created by frequency combination with the modulated signal.

Figure 6:
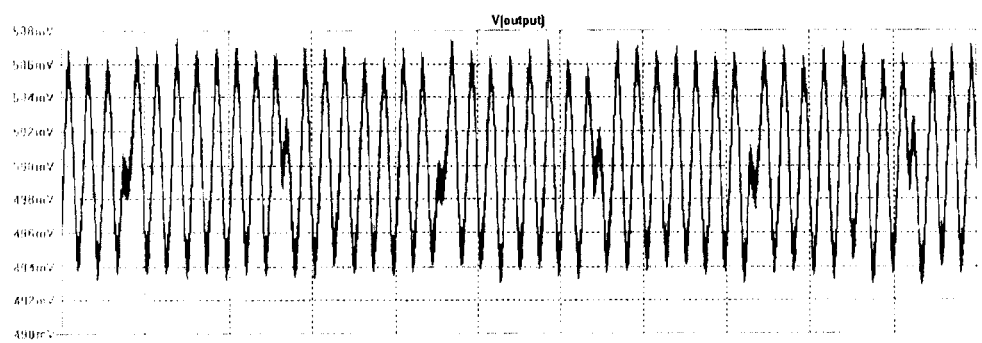
FIG. 6 illustrates the course of the subcarrier signal with the demodulated data.

On the FIG. 6 there is the course of the subcarrier signal with the demodulated data.

EXAMPLE

In this example there is a removable memory card 6 placed in the mobile phone 10; the memory card 6 also contains the payment card function. For the communication between this payment card and a POS terminal 9, a data transmission method (that uses two different frequencies) is used. The POS terminal 9 contains a contactless payment card reader 8. The card has to approach the Operating volume of the reader 8 in order for the communication connection to be established. The placement of the payment card 6 containing a communication element into the mobile phone's 10 slot deteriorates the possibility of full approach of the communication element on the payment card to the center of the reader's 8 operational volume. At the same time, the mobile phone's 10 slot is primarily designed for the insertion of a common memory card 6 and the communication element presents an undesirable shielding, part of the slot's body is made of metallic shapes shell. The communication element contains the transmitter 2 according to this invention and in this example it is placed directly on the micro SD card. The card's 6 format does not limit the extent of this invention, in the future any format whatsoever could be used. The continuing miniaturization of the memory cards 6 and of the corresponding slots deteriorates the possibilities of effective placement of the communication element on the card 6; however the solution described here solves the problem. The communication element uses the NFC platform. In real environment and in case of the mobile phone 10 is handled in a normal way by the user the transformer connection coefficient is k=0.2-0.001.

The contents and the structure of the transmitted data can be different, in this example the data necessary during communication and authorization of payment processes will be dealt with. The owner of a mobile phone 10 equips his device with a memory card 6 that is equipped with a transmitter 2. By doing this, he extends the functionality of his mobile phone 10. In preferable configuration, there will also be a payment card (corresponding to a different invention of this patent's applicant) on the memory card 6. It is important, that the connection of a mobile phone 10 with a memory card 6 will appear to the POS terminal 9 and its payment card reader 8 as a standard contactless card. So the structure of transmitted data will be in the accordance with the standards in payments. The advantage of the solution mentioned is a comfortable usability of the mobile phone's 10 user's interface.

The transmitter 2 contains a generator 4 of the electromagnetic waves with the frequency of 14.4075 MHz±7 kHz. This frequency is for 847 kHz higher than the receiver's 1 frequency. The receiver's frequency 1 is in the standard 13.56 MHz±7 kHz. The difference between the frequencies is $1/16$ of the carrier frequency of the receiver 1. It is important, if the generator 4 is connected and active to energize the antenna 3 when data are transmitted over transformer connection, which was not used up till now. In case generator 4 existed in the transmitter 2 in already existing solutions, the generator 4 was not designed for active activity in the transformer connection, since it was not necessary due to the same transmitting frequency. The generator 4 is connected to the resonant circuit 13, the output of which is connected to the antenna 3.

The data from the transmitter 2 on the memory card are transmitted into the receiver 1 in the POS terminal reader 8 through the transformer connection of the transmitter's 2 and receiver's 1 antenna inductions M. The data are modulated into the signal on the transmitter's 2 side and the receiver 1 transmits the carrier signal. The distance of the transmitter 2 from the receiver 1 will be in cm, basically the mobile phone's 10 body will be touching the reader 8 the transmission will be contactless in physical sense. The transmitter 2 can even move in the operational volume, while his speed would be lower than 1 m/s.

The transmitter 2 sends the signal with the frequency 14.4075 MHz±7 kHz, the receiver's 1 carrier frequency is 13.56 MHz±7 kHz. The difference between the frequencies has a value that corresponds to the size of the subcarrier frequency, which is derived as a $1/16$ of the carrier frequency according to the ISO 14443.

The signals of different frequencies are combined in the receiver's 1 and transmitter's 2 antenna system M and in the receiver 1, on the antenna's 7 output, the signal appears in the form of a connection of a carrier frequency and modulated subcarrier frequency with data. The carrier signal is separated from the result of the signal combination in the receiver 1. The result of this separation is a subcarrier signal, even though the transmitter 2 has never transmitted it physically. From the subcarrier signal the transmitted data are demodulated. The demodulation element 11 resonance circuit 13 and receiver's generator 1 have the same configuration and function as in today's existing technical solutions.

In this example, the basic time unit etu corresponds to the one bit time interval, so to the time necessary to transmit one data unit. In the data flow direction from the transmitter 2 into the receiver 1 the etu is defined as 1 etu=8/ft, where one ft is a frequency of the modulated signal that was transmitted by the transmitter 2. The basic transmission velocity is 106 kbits/s. During modulation of the signal from the transmitter 2, it is sufficient, if the phase is changed once per 1 etu (approx. once per 9.3 μs), so 16 times less frequently in comparison to the existing load modulation. Smaller broadband generates 12 dB less noise. The data transmitted are modulated directly by a change of the transmitter's 2 frequency signal phase, where $\phi=0°$ or $\phi=180°$. This modulated signal could also be called the receiver's 2 carrier signal, since however the transmitter 2 does not create the subcarrier frequency, then this frequency is only called the transmitter's 2 frequency signal.

The receiver's 2 antenna 3 is narrowly tuned to the transmitting frequency of 14.4075 MHz. The narrow and high course of the FFT curve as can be seen on the FIG. 3, shows the fact, that the antenna is tuned (without considering the radiation characteristics of the antenna 2) for the transmission of the subcarrier frequencies 847 kHz. In case this antenna should transmit even the subcarrier frequency, the radiation characteristics would we insufficient for a reliable transmission. In the solution according to this invention it is important that the signal radiation with the transmitted data is realized exactly on the 14.4075 MHz frequency, which is the peak of the FFT curve.

In our case it is necessary to ensure even reverse data flow direction from the POS terminal's 9 reader 8 into the memory card 6 in the mobile phone 10. The transmitter 2 encompasses the demodulation element 5, which is connected to the antenna's turning 3 toward s the sensor resistor 16 Rt, preferably over inductor 15 Lt3. The usage of the inductor 15 decreases the voltage peaks on the entrance to the demodulation element 5. Thanks to the turning and the inductor 15 Lt, the demodulation element 5 can be dimensioned to a smaller voltage. In this data flow direction, the etu is defined as 1 etu=128/fr, where fr is the carrier frequency of the receiver 1.

The mentioned way of transmission with creation of subcarrier part using wave interface only in the interspace between the transmitter 2 and the receiver 1 can be combined even with the usage of frequency convertor, which shifts the standardized frequency on the transmitter's 2 interface to the chosen zone with better transmission characteristics, e.g. in GHz. By this configuration, the transmitter 2 that is located e.g. on the removable memory card of the mobile phone, can be tuned to a different wave band, while the principle of transformer connection with the interference creation of the subcarrier part of the transmission can be used further on to lower the noise. The frequency convertor can be located on the payment cards' NFC reader 8 in the form of a sticker. The frequency convertor can have the antenna that is on the POS terminal's 9 side tuned to the frequency in the range from 13.00 to 14.00 MHz. The frequency convertor can be supplied with energy from the payment card reader's electromagnetic radiance so from the outside it will appear as energetically passive. Since the frequency convertor does not shield the entire range of the payment card reader's radiance, it can continue to be used for standard data transmission on the basic frequency and it is also possible to use data transmission over frequency convertor in one direction and without it in the other direction, e.g. using the way of transmission according to this description. In the direction of data transmission from the receiver 1 to the transmitter 2 (so in the opposite direction to the one described in the subject matter of the invention), the frequency convertor can be used in such a way that it shifts the transmission range to the level of e.g. 2,400 GHz.

THE INDUSTRIAL APPLICABILITY

The industrial usability is obvious. According to this solution it will be possible to transmit data even when the transformer connections between the receiver and the transmitter are weak. The invention decreases the noise of the system, makes the modulation on the transmitter's side while it is possible to use the existing receivers without change. According to the invention it is possible to repeatedly produce transmitters with the modulation of the basic carrier signal.

LIST OF RELATED SYMBOLS

1—receiver
2—transmitter
3—the transmitter's antenna
4—the generator of the electromagnetic waves
5—demodulation element
6—memory card
7—the receiver's antenna
8—payment card reader
9—POS terminal
10—mobile phone
11—receiver's demodulation element
12—transmitter's resonant circuit
13—receiver's resonant circuit
14—receiver's generator
Rt—sensor resistor on the transponder's side
Lt3—inductor
M—mutual induction, transformer connection
Lt1—induction of the part of the transimtter's antenna
Lt2—induction of the part of the transimtter's antenna
Lr1—induction of the receiver's antenna
Rr—the receiver's sensor circuit
OSCr—the receiver's oscillator
OSCt—the transmitter's oscillator

The invention claimed is:

1. A method for transmitting data from a transmitter to a receiver via a transformer connection of inductions of a transmitter antenna and a receiver antenna, where a signal received at the receiver appears in the form of a carrier frequency and a subcarrier frequency that is modulated with data at a second frequency with respect to the carrier frequency, and where the receiver expects a standard signal structure with a subcarrier frequency, the method comprising:

the receiver transmitting a carrier signal at a carrier frequency to the transmitter;

the transmitter comprising an electromagnetic wave generator operating at a transmitter transmission frequency, said transmitter modulating the data on a transmitter signal at the transmitter transmission frequency and sending the modulated data to the receiver by actively transmitting said transmitter signal at said transmitter transmission frequency by sending an electromagnetic wave to the transmitter antenna, wherein the transmitter transmission frequency is different from the carrier frequency, and the difference between the transmitter transmission frequency and the carrier frequency corresponds to a subcarrier frequency that the receiver expects; and the receiver receiving a received signal at the receiver antenna, the received signal being created by combining the carrier signal transmitted by the receiver with the modulated transmitter signal, the receiver separating the carrier signal from the received signal and demodulating the received signal as a combined signal having the carrier frequency and a modulated subcarrier frequency that is modulated with received data, wherein the received signal is created by combining the electromagnetic wave received at the receiver from the transmitter only via mutual antenna induction of the transformer connection of the receiver's and the transmitter's antenna inductions and without the transmitter transmitting a signal at the subcarrier frequency.

2. The method of claim 1, wherein the transmitter modulates the data on the transmitter signal by changing a transmitter transmission frequency signal phase.

3. The method of claim 1, wherein the carrier signal has a frequency of 13.56 MHz±7 kHz, and the difference between the carrier frequency and the transmitter transmission frequency is defined relative to the carrier frequency.

4. The method of claim 1, wherein the transmitter antenna is tuned to the transmitter transmission frequency, independent of transmission characteristics associated with the transmitter antenna for the subcarrier frequency.

5. The method of claim 1, wherein the transmitter is in the form of a transponder and the receiver is formed by a reader on an RFID and/or NFC platform.

6. The method of claim 1, wherein the transmitter is located in a mobile communication device.

7. The method of claim 1, wherein the transmitter and transmitter antenna are located on a removable memory card that is adapted to be received into a slot in a mobile communication device.

8. The method of claim 1, wherein the data are associated with a payment via a mobile communication device.

9. A method for transmitting data from a transmitter to a receiver, the transmitter having a transmitter antenna and the receiver having a receiver antenna, and where the receiver expects a standard signal structure with a subcarrier frequency, the method comprising:
the receiver transmitting a carrier signal at a carrier frequency;
the transmitter comprising an electromagnetic wave generator operating at a transmitter transmission frequency, said transmitter actively transmitting a transmitter signal at said transmitter transmission frequency by sending an electromagnetic wave to the transmitter antenna, wherein the transmitter transmission frequency is different from the carrier frequency, and the difference between the transmitter transmission frequency and the carrier frequency corresponds to a subcarrier frequency that the receiver expects;
the transmitter modulating the data on the transmitter signal at the transmitter transmission frequency and sending the modulated data to the receiver;
combining the electromagnetic wave of the carrier signal and the electromagnetic wave of the modulated transmitter signal in an antenna system of the receiver and the transmitter to form a combined signal; and
the receiver receiving the combined signal, and demodulating the received combined signal by separating the carrier signal from the combined signal to form a modulated subcarrier signal, and demodulating the transmitted data from the modulated subcarrier signal, wherein the received combined signal is created only via mutual antenna induction of a transformer connection of the receiver's and the transmitter's antenna inductions and without the transmitter transmitting a signal at the subcarrier frequency.

10. The method of claim 9, wherein the transmitter modulates the data on the transmitter signal by changing a transmitter transmission frequency signal phase.

11. The method of claim 9, wherein the carrier signal has a frequency of 13.56 MHz±7 kHz, and the difference between the carrier frequency and the transmitter transmission frequency is defined relative to the carrier frequency.

12. The method of claim 9, wherein the transmitter antenna is tuned to the transmitter transmission frequency, independent of transmission characteristics associated with the transmitter antenna for the subcarrier frequency.

13. The method of claim 9, wherein the transmitter is in the form of a transponder and the receiver is formed by a reader on an RFID and/or NFC platform.

14. The method of claim 9, wherein the transmitter is located in a mobile communication device.

15. The method of claim 9, wherein the transmitter and transmitter antenna are located on a removable memory card that is adapted to be received into a slot in a mobile communication device.

16. The method of claim 9, wherein the data are associated with a payment via a mobile communication device.

17. The method of claim 1, wherein the received signal is created with a coupling coefficient of k=0.2 to 0.001.

18. The method of claim 1, wherein during modulation in the transmitter the phase of the transmitted frequency is changed once per elementary time unit (etu) wherein the etu corresponds to a one bit time interval.

19. The method of claim 9, wherein the received combined signal is created with a coupling coefficient of k=0.2 to 0.001.

20. The method of claim 9, wherein during modulation in the transmitter the phase of the transmitted frequency is changed once per elementary time unit (etu) wherein the etu corresponds to a one bit time interval.

* * * * *